US012683754B2

(12) United States Patent
Schemmann et al.

(10) Patent No.: US 12,683,754 B2
(45) Date of Patent: Jul. 14, 2026

(54) FULL DUPLEX DOCSIS AMPLIFIER WITH LEGACY UPSTREAM SUPPORT

(71) Applicant: ARRIS Enterprises LLC, Suwanee, GA (US)

(72) Inventors: Marcel F.C. Schemmann, Maria Hoop (NL); Shamsuddin H. Chasmawala, Avon, CT (US); Zhijian Sun, Avon, CT (US); Brent D. Arnold, Doylestown, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 473 days.

(21) Appl. No.: 18/209,408

(22) Filed: Jun. 13, 2023

(65) Prior Publication Data

US 2023/0403128 A1     Dec. 14, 2023

Related U.S. Application Data

(60) Provisional application No. 63/352,105, filed on Jun. 14, 2022.

(51) Int. Cl.
| | |
|---|---|
| *H04L 5/14* | (2006.01) |
| *H04B 3/23* | (2006.01) |
| *H04L 12/28* | (2006.01) |
| *H04N 7/10* | (2006.01) |
| *H04N 21/61* | (2011.01) |

(52) U.S. Cl.
CPC ............. *H04L 5/1423* (2013.01); *H04B 3/23* (2013.01); *H04L 5/14* (2013.01); *H04N 7/102*

(2013.01); *H04N 21/6118* (2013.01); *H04N 21/6168* (2013.01); *H04L 12/2801* (2013.01)

(58) Field of Classification Search
CPC ..... H04L 5/1423; H04L 5/14; H04L 12/2801; H04B 3/23; H04N 7/102; H04N 21/6118; H04N 21/6168
See application file for complete search history.

(56) References Cited

U.S. PATENT DOCUMENTS

| | | | |
|---|---|---|---|
| 11,133,915 B2 | 9/2021 | Maxliner | |
| 11,546,578 B2 * | 1/2023 | Bschor ..................... | H04L 5/14 |
| 2017/0244445 A1 * | 8/2017 | Jin ......................... | H04B 3/232 |
| 2020/0280289 A1 | 9/2020 | Thomas | |
| 2020/0304278 A1 | 9/2020 | Jung | |
| 2021/0167936 A1 * | 6/2021 | Bowler .................... | H03F 3/62 |
| 2021/0227205 A1 * | 7/2021 | Bschor .................. | H04N 17/04 |

(Continued)

OTHER PUBLICATIONS

Qorvo, "How a Flexible Upstream Architecture in Amplifiers & Nodes Can Meet Higher Split Requirements, White Paper", Qorvo, © Feb. 2022 Qorvo US, Inc. (Year: 2022).*

(Continued)

*Primary Examiner* — Brian J. Gillis
*Assistant Examiner* — Chhian (Amy) Ling
(74) *Attorney, Agent, or Firm* — Chernoff, Vilhauer, McClung & Stenzel, LLP

(57) ABSTRACT

Devices, systems, and methods for amplifying full duplex signals that include a first frequency band shared between an FDX upstream signal and a downstream FDX signal, and a second frequency band having a legacy upstream signal, where the legacy upstream signal and the FDX upstream signal are amplified by a common amplifier.

16 Claims, 5 Drawing Sheets

(56) References Cited

U.S. PATENT DOCUMENTS

2022/0069969 A1    3/2022  Young

OTHER PUBLICATIONS

International Search Report and Written Opinion RE: Application No. PCT/US2023/025225, dated Sep. 28, 2023.

Coomans Werner et al: "Introducing Full Duplex in Hybrid Fiber Coaxial Networks", IEEE Communications Standards Magazine, IEEE, vol. 2, No. 1, Mar. 1, 2018, pp. 74-79, XP011680942, ISSN: 2471-2825, DOI: 10.1109/MCCOMSTD.2018.1700011 [retrieved on Apr. 10, 2018] the whole document.

"Data-Over-Cable Service Interface Specifications DOCSIS", ITU-T Draft; Study Perios 2017-2020; Study Group 9, International Elecom-munication Union, Geneva ; CH, Feb. 17, 2020, pp. 1-654, XP044289242, Retrieved from the Internet: URL:https://www.itu.int/ifa/t/2-17/sg9/docs/c/ties/T17-SG09-C-0112!!ZIP-E.zip DOCSIS%204.0/CM-SP-CCAP-OSSIv4.0-101-190815.pdf [retrieved on Feb. 17, 2020] the whole document.

Coomans Werner et al: "Full Duplex DOCSIS over Active (N+X) Cable Networks", SCTE-ISBE, Cable-TEC, 2-19 Expo, Oct. 3, 2019, Sep. 30, 2019, pp. 1-23, XP055858065, Retrieved from the Internet: URL:https://www.nctatechnicalpapers.com/Paper/2019/2019-full-duplex-docsis-over-active-n-x-cable-networks/download [retrieved on Nov. 4, 2021] the whole document.

* cited by examiner

Prior Art

FULL DUPLEX DOCSIS AMPLIFIER WITH LEGACY UPSTREAM SUPPORT

CROSS REFERENCE TO RELATED APPLICATIONS

This application claims the benefit of U.S. Provisional Patent Application Ser. No. 63/352,105 filed Jun. 14, 2022.

BACKGROUND

The subject matter of this application relates to amplifiers in full duplex communications architectures.

Cable Television (CATV) services typically provide content to large groups of subscribers from a central delivery unit, called a "head end," which distributes channels of content to its subscribers from this central unit through a branch network comprising a multitude of intermediate nodes. Modern Cable Television (CATV) service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber and to the content provider through the branch network.

To this end, CATV head ends have historically included a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). Still other modern CATV systems called Remote PHY (or R-PHY) relocate the physical layer (PHY) of a traditional CCAP by pushing it to the network's fiber nodes. Thus, while the core in the CCAP performs the higher layer processing, the R-PHY device in the node converts the downstream data sent by the core to be transmitted on radio frequency from digital-to-analog, and converts the upstream RF data sent by cable modems to be transmitted optically to the core from analog-to-digital format.

Regardless of which architectures were employed, historical implementations of CATV systems bifurcated available bandwidth into upstream and downstream transmissions, i.e., data was only transmitted in one direction across any part of the spectrum. For example, early iterations of the Data Over Cable Service Interface Specification (DOCSIS) specified assigned upstream transmissions to a frequency spectrum between 5 MHz and 42 MHz and assigned downstream transmissions to a frequency spectrum between 50 MHz and 750 MHz. Though later iterations of the DOCSIS standard expanded the width of the spectrum reserved for each of the upstream and downstream transmission paths, the spectrum assigned to each respective direction did not overlap.

Due to ever-increasing demand for both upstream and downstream services, content providers have sought to increase the spectrum of both services to customers in both upstream and downstream directions, moving the split between these services upwards. Again, however, upgrading the equipment from the head end to the subscribers premises to accommodate the increase in bandwidth is expensive. Therefore, different architectures for propagating signals to and from customers have been proposed.

One such proposed architecture is full duplex (FDX) DOCSIS technology. With FDX DOCSIS, upstream and downstream spectrum is no longer separated, allowing up to 5 Gbps upstream service and 10 Gbps downstream service over the cable access network. In a full duplex system, because the CCAP/R-PHY core knows the characteristics of its own downstream transmission, it can distinguish upstream communications transmitted in the same frequencies that it provides those downstream services. A transition to full duplex DOCSIS architectures is costly, and many providers have therefore opted to roll out FDX networks gradually, offering it to higher-service tiers of customers. This, however, means that provider networks will need to accommodate customers that utilize full duplex signals, in which spectrum is shared between upstream and downstream signals, as well as customers that must send upstream signals in a different spectrum than that which they receive downstream signals. Such accommodation itself involves complexity and expense.

What is desired, therefore, are improved devices, methods, and architectures that more efficiently process and process both full duplex signals and legacy upstream signals that do not share spectrum with downstream signals.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figures 1A, 1B:
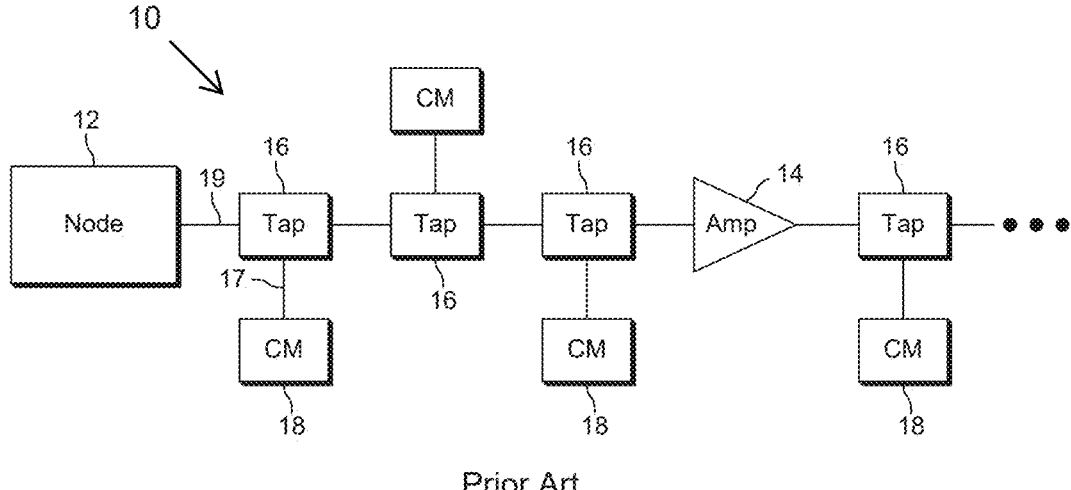
FIG. 1A shows an exemplary legacy architecture for delivering communication signals to and from subscribers.
FIG. 1B shows a schematic of an amplifier for the architecture of FIG. 1.

Referring to FIG. 1, a legacy communications architecture 10 is shown in which upstream and downstream signals are communicated between a node 12 and a plurality of customer cable modems 18. Those of ordinary skill in the art will appreciate that the node 12 may be connected to a head end (not shown) and may in some embodiments be a remote device in a distributed access architecture, such as a Remote Physical Device (RPD), Remote MACPHY Device (RMD), etc. Those of ordinary skill in the art will appreciate that, although cable modems are used to illustrate customer premises equipment, other such equipment may include a variety of devices such as set top boxes (STBs), Optical Network Units (ONUs) etc.

The node 12 and the cable modems 18 are typically connected to each other via a plurality of signal-bearing lines 19, which may be for example coaxial cable, fiber optic cable, etc. Though only one such line 19 is shown, typically there are multiple such lines arranged in a branching network from the node 12 to a number of service groups of subscribers. Each subscriber is connected to the line 19 by a trunk cable 17 that extends from a tap 16. Also, to compensate for power losses in line 18, one or more amplifiers 14 are used to regenerate the signals sent between the node 12 and the cable modems 18.

As noted earlier, in such legacy systems the node 12 communicates a downstream signal to each of the cable modems, and each of the cable modems communicate an upstream signal that occupies a spectrum separated from that of the downstream signal. For example, upstream signals may be sent in the 5-85 MHz range, while downstream signals may be sent in the 108-834 MHz (or higher) range. The amplifier 14 must therefore amplify both these signals.

FIG. 1B shows a schematic of such an amplifier 14 in which diplexers 20a, 20b on either side of the amplifier isolate the upstream and downstream signals. Diplexers 20a and operate to isolate the upstream and downstream signals for separate processing in the amplifier 14, while combining these signals for propagation along line 19. In the example shown, a downstream signal occupying the spectrum from 108-835 MHz is amplified by power amplifier 22a, and then optionally is adjusted by gain/tilt module 24 to compensate for the frequency dependence of losses along line 19. In the upstream direction, the upstream signal occupies the spectrum from 5-85 MHz and is amplified by power amplifier 22b.

Figure 2A:
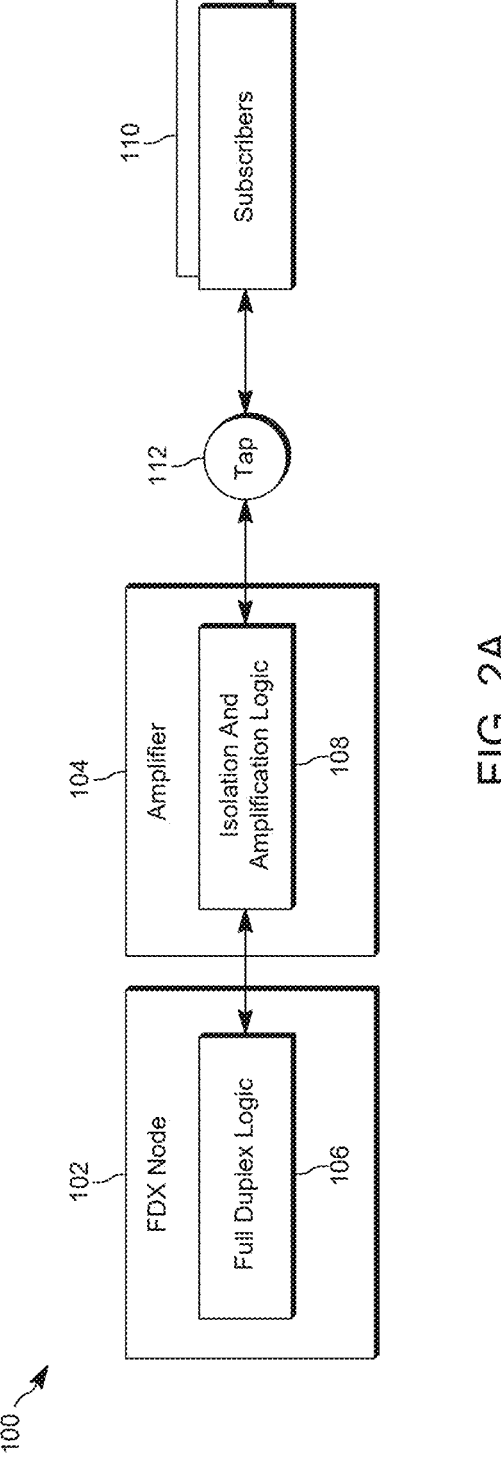
FIGS. 2A and 2B show an exemplary full duplex (FDX) architecture for delivering communication signals to and from subscribers.

As also noted earlier, in an effort to expand both upstream and downstream capacity, full duplex architectures have been implemented. Referring to FIG. 2A, which shows an exemplary such full duplex architecture, an FDX system 100 may include an FDX node 102, an amplifier 104, and subscribers 110. It will be understood that other components of the network may be included, such as other FDX nodes 102 and amplifiers 104. Further, although not shown, a head end may be located upstream of FDX node 102. In some embodiments, FDX node 102 may be part of a remote physical (PHY) device that can be located closer to the subscriber's premises, such as in a node located in the neighborhood where the subscribers are located. The relocated physical device is referred to as a remote physical device (RPD). FDX node 102 converts packets on a digital interface, such as an Ethernet interface received via a digital network, such as via optical fiber, to analog signals, such as radio frequency (RF) signals, on a hybrid fiber coaxial (HFC) network. FDX node 102 sends the RF signals to modems located at a subscriber's premises via an analog network, such as via coaxial cable.

Full duplex signals may include different types of traffic, such as data and video. In the downstream direction, signals from the head end are sent through FDX node 102 toward subscribers 110 through amplifier 104. A group of subscribers may be connected to a tap 112 that provides connections to subscribers 110. Subscribers 110 may include subscriber devices, such as modems that receive the downstream signals and send the upstream signals. In some embodiments, the modems include cable modems, but other devices may be appreciated, such as gateways. In the upstream direction, subscribers 110 send upstream signals toward the head end through amplifier 104 and FDX node 102.

In the downstream direction, FDX node 102 may receive a downstream signal from the headend and process the downstream signal using full duplex logic 106. FDX node 102 may receive packets via a digital network. Then, FDX node 102 sends the downstream signal to amplifier 104. The downstream signal may be sent via an analog network. Amplifier 104 then amplifies the downstream signal in the analog domain. Also, in the upstream direction, amplifier 104 receives upstream signals and can amplify the upstream signals in the analog domain. Then, amplifier 104 sends the upstream signals towards the head end, which eventually reach FDX node 102. The upstream signals are sent via the analog network.

Amplifier 104 receives the downstream and the upstream signals in the same frequency band, which may be a range of frequencies that includes both the downstream and the upstream signals. In some embodiments, the downstream and upstream signals are sent at the same time, but in other embodiments may be sent at different times. Amplifier 104 may process the downstream and upstream signals using isolation and amplification logic 108, which may separate the downstream and upstream signals that are sent in the same frequency band. Isolation and amplification logic 108 then can amplify the downstream signal using a first path and the upstream signal using a second path. The amplification is performed in the analog domain while isolating the downstream signal and the upstream signal from one another. After amplification, amplifier 104 may send the downstream signals toward subscribers 110 and send the upstream signals toward a head end.

In some embodiments, FDX amplifiers 104 may replace legacy amplifiers in the network shown in FIG. 1A. The use of FDX amplifiers 104 allows full duplex traffic to be sent in the network without having to replace the legacy analog amplifiers with FDX nodes 102. Also, the connection between FDX node 102 and FDX amplifiers 104 may be transmit analog signals, such as radio frequency (RF) signals, that may be communicated over a coaxial cable instead of fiber. This means that the signals in the downstream direction from FDX node 102 to FDX amplifier 104 may be in the analog domain. If fiber was used, then the communications from FDX node 102 to another FDX node may be in the digital domain, which would require the coaxial cable to be replaced between two FDX nodes 102.

Figure 2B:
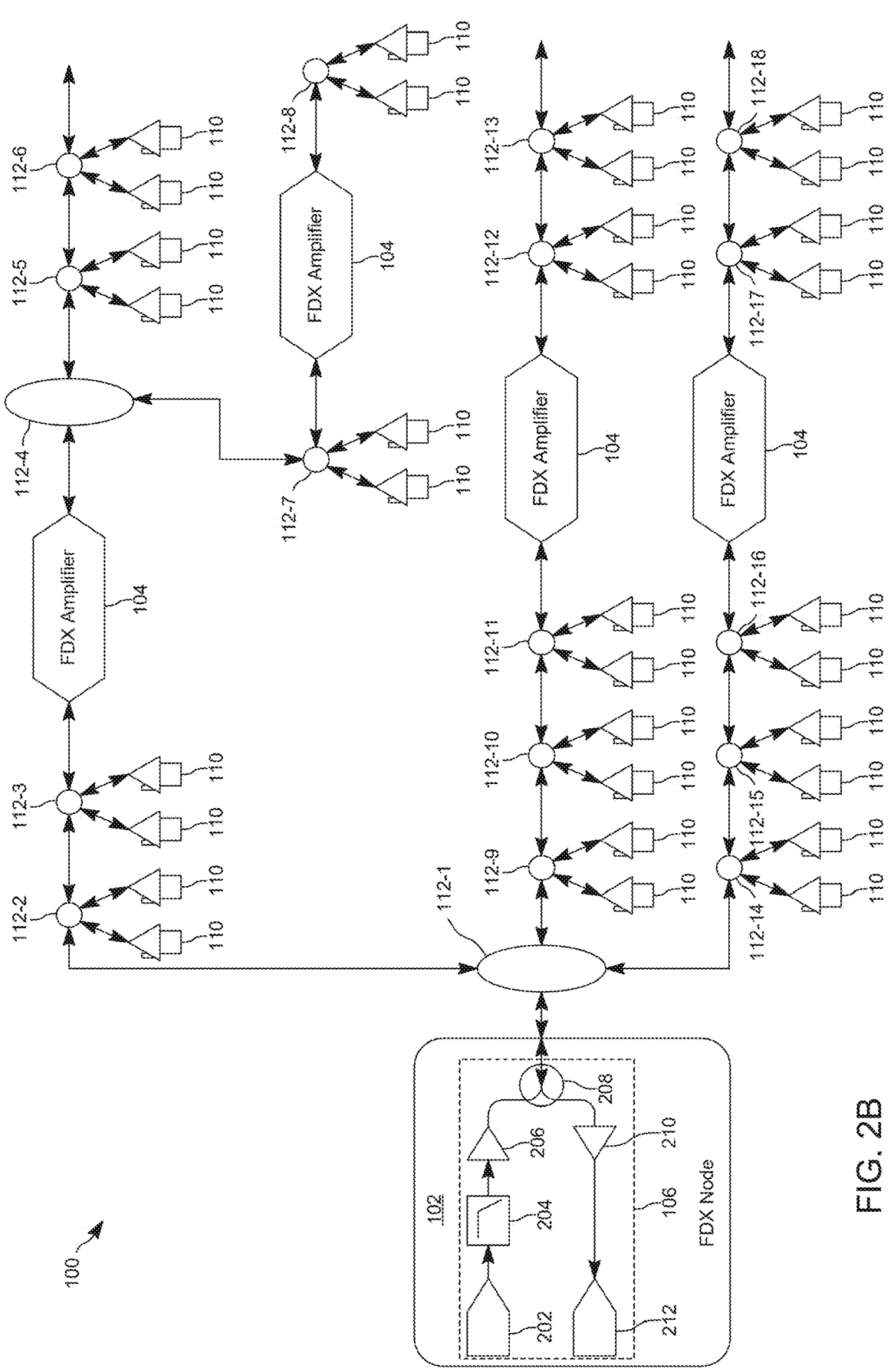

Referring also to FIG. 2B, which depicts a more detailed example of system 100 according to some embodiments, in the network, various taps 112-1 to 112-18 are included that couple signals to subscribers 110. Additionally, different FDX amplifiers 104 may be included in various positions to provide amplification in the network at different points.

FDX node 102 uses full duplex logic 106 to convert digital signals to analog signals in the downstream direction and convert analog signals to digital in the upstream direction. In the downstream direction, full duplex logic 106 in FDX node 102 may include a digital-to-analog converter (DAC) that converts the digital signal to analog. An anti-aliasing filter 204 may attenuate the higher frequencies to prevent aliasing components from being sampled. Then, a power amplifier 206 amplifies the signal. A directional coupler 208 couples the analog downstream signal to tap 112-1.

In the upstream direction, directional coupler 208 receives the analog upstream signal and couples the signal to amplifier 210, which amplifies the upstream signal. Then, an analog-to-digital converter 212 converts the analog signal to digital. The digital upstream signal can then be sent toward the head end. Although this full duplex logic is described, it will be understood that other variations of the full duplex circuitry may be appreciated.

Because FDX technology shares the same frequency band for downstream and upstream signals to support higher bandwidth, the full duplex logic 106 and isolation and amplification logic 108 requires complex signal processing units to process the FDX signals to minimize the reflections/signals travelling in undesired directions, e.g., upstream signal mixing with downstream and vice versa. The deployment of this technology requires use of an FDX compatible bi-directional amplifier for N+x cable plant systems in addition to nodes and cable modems. This contrasts with non FDX DOCSIS systems where Downstream and Upstream signals use separate frequency bands.

Furthermore, as noted previously, when providers do deploy FDX, they will likely still have customers in their plant who are not using new/upgraded FDX service tiers, and therefore there will be a mix of modems (FDX and legacy). Thus, the FDX amplifier 104 must also support non-FDX (legacy) upstream signals in addition to FDX upstream signals. Conventional approaches of using separate circuits for FDX and legacy bands result in an amplifier 104 with high power consumption and a large footprint. Amplifiers with higher power consumption may require additional changes to the powering network, adding significant additional cost and manpower, resulting in slower network upgrades.

Figure 3:
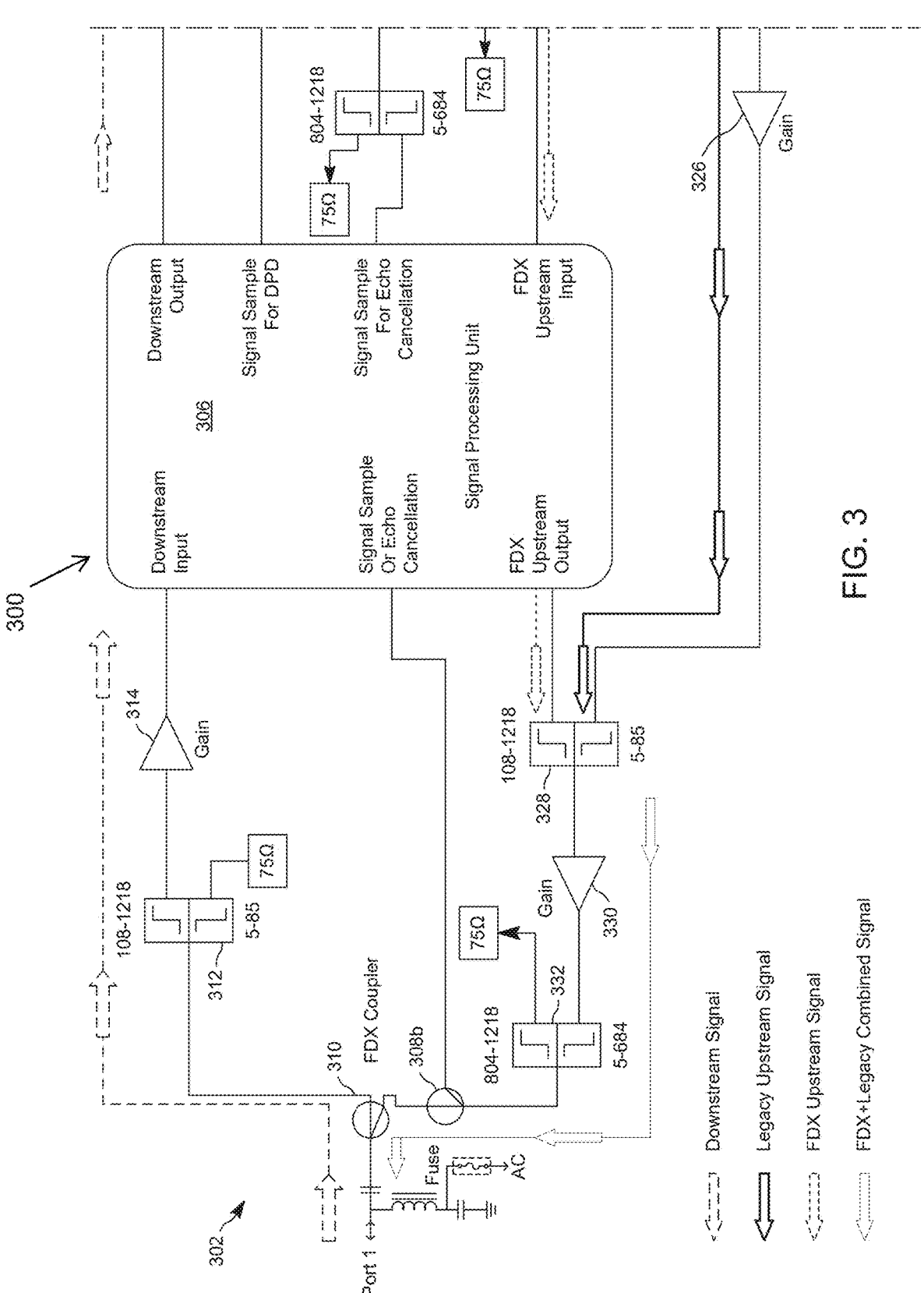
FIG. 3 shows an exemplary amplifier that amplifies both a full duplex (FDX) signal in which upstream and downstream signals.
Figure 3:
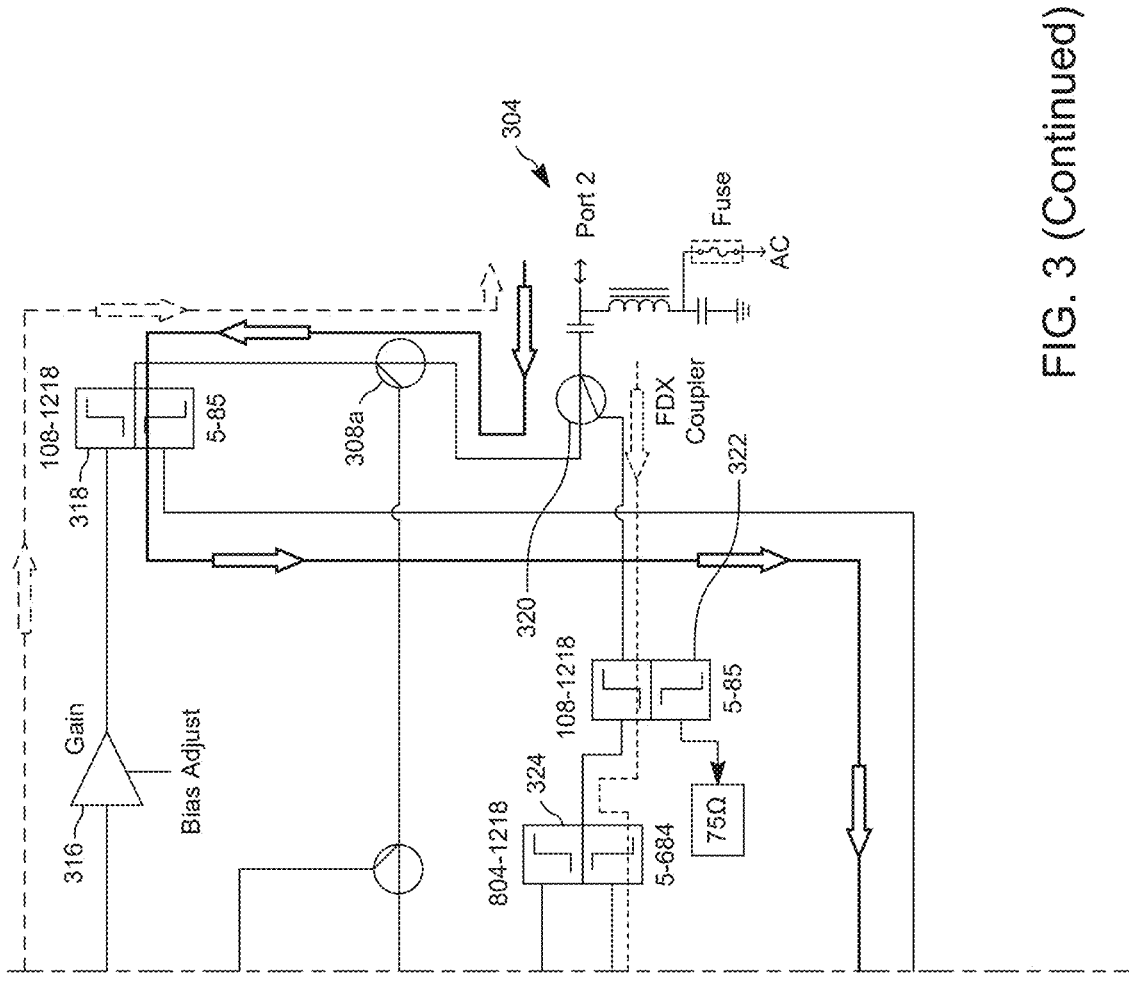

Referring to FIG. 3, an improved FDX amplifier circuit 300 preferably utilizes a common circuit to amplify signals in both an FDX band and a legacy upstream band. This approach eliminates the use of dedicated gain/amplifier stages for the legacy upstream path and the FDX upstream path, which in turn produces lower power consumption, lower amplifier temperatures, and reduces the amount of components on the amplifier's printed circuit board (PCB).

Specifically, the full duplex amplifier circuit 300 includes a northbound port 302 positioned towards a node or head end and a southbound port 304 positioned towards one or more subscribers downstream of the amplifier circuit 300. Each port 302, 304 propagates a signal that includes both upstream and downstream data, in which the downstream data is transmitted within spectrum that overlaps a portion of the spectrum dedicated to upstream data, while the remaining portion of the upstream spectrum that does not overlap the downstream spectrum is used for legacy subscribers that have not upgraded to full duplex services. For example, each port 302, 304 may propagate a signal spanning a frequency range from 5 MHz to 1.218 Ghz, where the frequency range of 5-85 MHz is dedicated only to upstream transmissions, the frequency range of 108-1.28 GHz is used for downstream transmissions, and the frequency range of 108-684 MHz (which overlaps downstream spectrum) is used for upstream transmissions from customers that have been upgraded to enable full duplex services. The spectrum between 85 MHz and 108 MHz may be used as a guardband between the legacy upstream signal and the full duplex signal. Furthermore, those of ordinary skill in the art will appreciate that the frequency splits just described are exemplary, and other implementations may assign different boundaries to the legacy upstream signals, the downstream signals, and the full duplex band in which upstream and downstream signals overlap.

As noted earlier, because a full duplex signal includes upstream and downstream transmissions that overlap in frequency, the amplifier circuit 300 preferably includes a Signal Processing Unit (SPU) 306 that processes the upstream and downstream signals to minimize reflections and collect samples for digital predistortion (DPD). Specifically, a directional coupler 308a proximate the southbound port 304 may sample the full duplex signal at the southbound port 304 and pass the sample to the SPU to be processed for digital predistortion and also, after filtering to pass only the portion of the signal in the overlapping region of the full duplex spectrum, to be processed for echo cancellation. Similarly, proximate the northbound port 302, a directional coupler 308b may sample the full duplex signal, including both the legacy upstream spectrum and the full duplex overlapping upstream spectrum, and pass the sample to the SPU 306 for echo cancellation.

The amplifier circuit 300 preferably separates the upstream and downstream transmissions for separate amplification. At the northbound port 302, an FDX coupler 310 routes the downstream signal to a low-loss port of the coupler 310, which is connected to a diplexer 312 that isolates the downstream portion of the full duplex signal between 108 MHz and 1.28 GHz from the legacy upstream portion of the full duplex signal between 5-85 MHz. The isolated downstream full duplex signal may optionally be amplified by a low-noise preamplifier 314 before being sent to the downstream input of the SPU 306, which performs the echo cancellation and distortion compensation, before outputting the downstream signal at its downstream output port. After being output from the SPU 306, the downstream signal may be amplified by power amplifier 316 before being passed through diplexer 318 to the southbound port 304 via directional coupler 320 of the amplifier circuit 300.

Similarly, at the southbound port 304, a directional coupler 320 may pass the upstream signal to its coupled output port, which in turn is connected to two diplexers 322 and 324 that together filter the upstream signal to remove the legacy portion of the upstream signal, and pass only the spectrum of the upstream signal from 108-684 MHz that overlaps with the downstream signal to the FDX upstream input. The SPU 306 optionally amplifies the received upstream signal and outputs it onto the FDX upstream output of the SPU 306.

While the amplifier circuit 300 routes the FDX shared-spectrum portion of the upstream signal through the SPU 306, the amplifier circuit 300 preferably diverts the legacy portion of the upstream signal around the SPU 306. Thus, at the southbound port 304, the FDX coupler 320 preferably routes the upstream signal to its low-loss (non-coupled) port where it is subsequently filtered by diplexer 318 to only pass the legacy portion of the upstream signal, in this example the spectrum from 5-85 MHz. Following the diplexer 318, the legacy portion of the upstream signal is optionally amplified by a low-noise preamplifier 326 before the legacy portion of the upstream signal is recombined with the FDXZ shared-spectrum portion of the upstream signal by diplexer 328. A power amplifier 330 then amplifies the combined upstream signal. The amplifier circuit 300 also preferably includes a diplexer 332 at the output of the power amplifier 330 that isolates the power amplifier from the portion of the shared FDX spectrum above that occupied by the upstream FDX signal.

As noted previously, by diverting the legacy portion of the upstream signal around the SPU 306 and recombining it with the FDX shared-spectrum portion of the upstream signal prior to amplification by the power amplifier 328, the amplifier circuit 300 produces lower power consumption, lower amplifier temperatures, and reduces the amount of components on the amplifier's printed circuit board (PCB) relative to existing approaches that use dedicated amplification circuits for legacy upstream signals and FDX shared-spectrum upstream signals. Furthermore, in the preferred embodiment described, by routing the upstream legacy signal through the low-loss port of the FDX coupler 320 at the southbound port 304 of the FDX amplifier circuit 300, a higher signal level reaches the preamplifier 326 and/or power amplifier 330 resulting in a better signal to noise ratio. Alternate embodiments may instead route the upstream legacy signal through the coupled port of FDX coupler 320. Such an embodiment would result in more signal losses prior to the preamplifier 326/power amplifier 330, requiring more amplification, resulting in a worse signal to noise ratio.

Those of ordinary skill in the art will recognize that any or all of the diplexers 312, 318, 322, 324, 328, and 322 may be replaced by other filters or filter combinations, such as high pass filters, low pass filters, bandpass filters, etc. Furthermore, those of ordinary skill in the art will appreciate that in some embodiments, the filter 318 may be repositioned to a location that is between coupler 320 and coupler 308*a*, or may in other embodiments be positioned southbound of coupler 320 such that the legacy 5-85 MHz signal is output directly to the amplifier 326 while only the 108-1218 MHz signal passes through the coupler, which in this last embodiment would obviate the need for filter 322.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An amplifier circuit comprising:
a northbound port and a southbound port, each propagating a full duplex (FDX) signal having a first frequency band that includes both an FDX upstream signal and a downstream FDX signal, and each propagating a legacy upstream signal in a second frequency band that is free from including a downstream signal; and
a power amplifier that simultaneously amplifies the FDX upstream signal and the legacy upstream signal,
at least one electrical component that isolates the FDX upstream signal from the legacy upstream signal;
wherein the FDX upstream signal is processed by a signal processing unit after isolation from said legacy upstream signal and said FDX upstream signal is processed differently than said legacy upstream signal; and
the FDX upstream signal and the legacy upstream signal are simultaneously amplified after said FDX upstream signal is processed differently than said legacy upstream signal.

2. The amplifier circuit of claim 1, wherein the signal processing unit performs at least one of echo cancellation and digital predistortion.

3. The amplifier circuit of claim 1 including a preamplifier that amplifies the legacy upstream signal but does not amplify the FDX upstream signal.

4. The amplifier circuit of claim 1 including a second power amplifier that amplifies the downstream FDX signal.

5. The amplifier circuit of claim 4 including at least one electrical component that isolates the FDX downstream signal from the legacy upstream signal.

6. The amplifier circuit of claim 1 including an FDX coupler at the southbound port having a low-loss port and a coupled port, where the power amplifier is positioned between the low-loss port and an FDX coupler at the northbound port.

7. The amplifier circuit of claim 6 where the coupled port is connected to an upstream input of the signal processing unit.

8. The amplifier circuit of claim 7 including at least one electrical component that isolates the FDX downstream signal from the legacy upstream signal.

9. The amplifier circuit of claim 8 where the at least one electrical component is located between the coupled port and the upstream input of the signal processing unit.

10. The amplifier circuit of claim 8 where the at least one electrical component is located between a high-loss port of the coupled port and the upstream input of the signal processing unit.

11. The amplifier circuit of claim 1 that also propagates a downstream signal in a third frequency band.

12. The method of claim 1 including isolating the FDX downstream signal from the legacy upstream signal.

13. A method comprising:
receiving at an full duplex (FDX) amplifier circuit a full duplex downstream signal and a full duplex upstream signal that together share a first frequency band;
receiving at the FDX amplifier a legacy upstream signal in a second frequency band that is free from including a downstream signal;
isolating the full duplex upstream signal from the legacy upstream signal;
after isolating the full duplex upstream signal processing in a signal processing unit the full duplex upstream signal differently than said legacy upstream signal; and
simultaneously amplifying a combined signal that includes both the full duplex upstream signal and the legacy upstream signals;
wherein the full duplex upstream signal and the legacy upstream signal are simultaneously amplified after processing the full duplex upstream signal differently than said legacy upstream signal.

14. The method of claim 13 including performing at least one of echo cancellation and digital predistortion in the signal processing unit.

15. The method of claim 13 including pre-amplifying the legacy upstream signal but without pre-amplifying the FDX upstream signal.

16. The method of claim 13 including amplifying the downstream FDX signal.

* * * * *